(12) United States Patent
Reuschel

(10) Patent No.: US 8,862,353 B2
(45) Date of Patent: Oct. 14, 2014

(54) PROCESS FOR DETECTING TUNING MEASURES

(75) Inventor: Michael Reuschel, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 696 days.

(21) Appl. No.: 12/944,329

(22) Filed: Nov. 11, 2010

(65) Prior Publication Data

US 2011/0112738 A1    May 12, 2011

(30) Foreign Application Priority Data

Nov. 12, 2009 (DE) .......................... 10 2009 052 979

(51) Int. Cl.
     *G06F 7/00*      (2006.01)
     *G06F 17/00*      (2006.01)
     *G06F 19/00*      (2011.01)

(52) U.S. Cl.
     USPC .............. 701/68; 701/67; 192/82 T; 477/166; 477/174; 477/177

(58) Field of Classification Search
     USPC .............. 477/6, 86, 177, 166, 174; 192/54.1, 192/84.6, 82 T; 180/65.225; 701/68
     See application file for complete search history.

(56) References Cited

U.S. PATENT DOCUMENTS

| | | | | |
|---|---|---|---|---|
| 4,803,628 A | * | 2/1989 | Hayashi et al. | 701/68 |
| 5,679,091 A | * | 10/1997 | Salecker et al. | 477/86 |
| 5,743,829 A | * | 4/1998 | Tanizawa et al. | 477/174 |
| 5,890,992 A | * | 4/1999 | Salecker et al. | 477/86 |
| 6,059,690 A | * | 5/2000 | Tanizawa et al. | 477/169 |
| 6,105,743 A | * | 8/2000 | Salecker et al. | 192/84.6 |
| 6,152,275 A | * | 11/2000 | Fischer et al. | 192/82 T |
| 6,386,351 B1 | * | 5/2002 | Salecker et al. | 192/54.1 |
| 6,471,022 B1 | * | 10/2002 | Goebel et al. | 192/3.58 |
| 6,616,559 B1 | * | 9/2003 | Kubota et al. | 475/23 |
| 6,770,010 B2 | * | 8/2004 | Matsumura et al. | 477/124 |
| 7,140,460 B2 | * | 11/2006 | Shimizu et al. | 180/65.225 |
| 7,630,812 B2 | * | 12/2009 | Jiang et al. | 701/68 |
| 8,285,462 B2 | * | 10/2012 | Heap et al. | 701/54 |
| 8,666,618 B2 | * | 3/2014 | Lin et al. | 701/54 |

(Continued)

FOREIGN PATENT DOCUMENTS

DE    10 2005 039 760 A1    3/2007

OTHER PUBLICATIONS

Sequences of field-oriented control for the detection of faulty rotor bars in induction machines—the Vienna Monitoring Method Kral, C.; Wieser, R.S.; Pirker, F.; Schagginger, M.; Industrial Electronics, IEEE Transactions on; vol. 47 , Issue: 5, Digital Object Identifier: 10.1109/41.873212; Publication Year: 2000 , pp. 1042-1050.*

(Continued)

*Primary Examiner* — Cuong H Nguyen
(74) *Attorney, Agent, or Firm* — Lucas & Mercanti, LLP

(57) ABSTRACT

The invention relates to a process for detecting tuning measures through which the actual output power of an internal combustion engine of a motor vehicle is increased relative to design output power value, whereby, to detect the tuning measures, deviations of actual output power value from a nominal output power value are evaluated, the latter being provided by a control device.

The invention is distinguished in that measures are initiated to protect a clutch device from overload as soon as torque to be transmitted by the clutch device exceeds a critical value.

10 Claims, 2 Drawing Sheets

(56) References Cited

U.S. PATENT DOCUMENTS

| | | | |
|---|---|---|---|
| 2002/0134637 A1* | 9/2002 | Salecker et al. | 192/54.1 |
| 2004/0010360 A1* | 1/2004 | Kishibata et al. | 701/54 |
| 2004/0038775 A1* | 2/2004 | Shimizu et al. | 477/6 |
| 2006/0231306 A1* | 10/2006 | Severinsky et al. | 180/65.2 |

OTHER PUBLICATIONS

Sequences of field oriented control for the detection of faulty rotor bars in induction machines. The Vienna monitoring method Kral, C.; Pirker, F.; Schagginger, M.; Wieser, R.S.; Advanced Motion Control, 1998. AMC '98-Coimbra., 1998 5th International Workshop on; Digital Object Identifier: 10.1109/AMC.1998.743581; Pub. Year: 1998 , pp. 463-468.*

Simulation of an electrical variable transmission based on dual mechanical ports electric machine with clutch; Guo Xinhua ; Wen Xuhui ; Chen Jingwei ; Zhao Feng ; Guo Xizheng; Vehicle Power and Propulsion Conference, 2008. VPPC '08. IEEE Digital Object Identifier: 10.1109/VPPC.2008.4677476; Publication Year: 2008 , pp. 1-5.*

Simulation of Fuzzy Optimal Control Strategy on a Parallel Hybrid Electrical Vehicle; Tao Zhao ; Qunjing Wang ; Weidong Jiang ; Zheng Li; Intelligent Control and Automation, 2006. WCICA 2006. The Sixth World Congress on; vol. 2 Digital Object Identifier: 10.1109/WCICA.2006.1713595; Publication Year: 2006 , pp. 8306-8310.*

Power management in an autonomous adjustable speed large power diesel gensets; Iwanski, G. ; Koczara, W.; Power Electronics and Motion Control Conference, 2008. EPE-PEMC 2008. 13th; Digital Object Identifier: 10.1109/EPEPEMC.2008.4635586 Publication Year: 2008 , pp. 2164-2169.*

* cited by examiner

PROCESS FOR DETECTING TUNING MEASURES

CROSS REFERNCE TO RALATED APPLICATIONS

This application claims the priority of DE 102009052979.9 filed Nov. 12, 2009, which is incorporated by reference herein.

BACKGROUND OF THE INVENTION

The invention relates to a process for detecting tuning measures through which the actual output power of an internal combustion engine of a motor vehicle is increased relative to the design output power, whereby, to detect the tuning measures, deviations between actual and nominal output power provided by a control device are evaluated. The invention further relates to a motor vehicle with a drive train that comprises an internal combustion engine, transmission and at least one clutch device.

From the published German application document—DE 10 2005 039 760 A1—a process for detecting external tuning measures is disclosed, whereby the actual output power of an internal combustion engine is increased relative to an output power, and which comprises manipulation outside a control device of the internal combustion engine, whereby, to detect the external tuning measures, deviations of actual output power from nominal output power provided by the control device is evaluated. If an external tuning measure was detected, a measure is initiated, especially an entry is made in an error memory, maximum torque is limited and/or the internal combustion engine is operated in a safety mode or is shut down.

SUMMARYY OF THE INVENTION

It is task of the invention to improve a process in accordance with the generic term of the claim 1, especially with regard to the function of a clutch device in the drive train of a motor vehicle.

The task in a process for detecting the tuning measures through which the actual output power of an internal combustion engine of a motor vehicle is increased relative to the design output power, whereby, to detect the tuning measures, deviations of an actual output power from a nominal output power provided by a control device are evaluated; the task being solved in that measures for protecting a clutch device from overload are initiated as soon as torque to be transmitted by the clutch device exceeds a critical value.

The detection of a critical value can result in that, for example, the actual clutch torque values calculated by the transmission control based on available internal adaptation exceed the permanently stored limit values and at the same time, a corresponding clutch slip occurs. A further critical value is where the clutch is in the operating point of maximum torque transmission and thereby features slip but clutch malfunction or damage do not exist.

Via the clutch device or engine control, the torque transmission in the drive train of a motor vehicle can be quickly limited and/or interrupted in a simple manner. In this way, undesirable damage to the clutch device and/or to other torque-transmitting parts in the drive train of the motor vehicle can be prevented with certainty. The measures for protection of the clutch device from overload comprise preferably an opening of the clutch or an action to reduce the engine torque. The clutch can be opened completely or only partially. Engine torque can be reduced by communicating with the engine control and should take place in a manner that the attained actual output power values do not exceed the nominal output power values. In both cases, an entry—that an overload was detected—should be made, for example, in an error memory of the transmission control device.

A preferred exemplary embodiment is characterized in that the deviations above a given threshold value are integrated and measures for protection of the clutch device from overload are initiated as soon as the integral value exceeds an upper limit. An improvement of the output power of the internal combustion engine can be detected through tuning measures by integrating the deviations.

A further preferred exemplary embodiment of the process is characterized in that a current actual acceleration of the motor vehicle is compared with a nominal acceleration, in order to determine the deviations of the actual output power value from the nominal output power value. Vehicle acceleration can be calculated with suitable software, for instance.

A further preferred exemplary embodiment of the process is characterized in that nominal acceleration is calculated from nominal torque. This calculation can take place by means of the software at the respective operating point, from a substitute characteristic diagram in which, for example, engine torque is plotted versus engine speed.

A further preferred exemplary embodiment of the process is characterized in that the nominal torque is calculated from a substitute characteristic diagram that is deposited in a transmission control device. By using the substitute characteristic diagram, a theoretical nominal acceleration that is compared to the current actual acceleration can be calculated with the software.

A further preferred exemplary embodiment of the process is characterized in that a current actual torque provided by the engine is compared with a nominal torque in order to determine the deviations of the actual output power value from the nominal output power value. The current actual torque is sent, for example, from the internal combustion engine to the transmission control device. The nominal torque is deposited, for example, in the transmission control device.

A further preferred exemplary embodiment of the process is characterized in that a current actual clutch torque is compared with a nominal clutch torque in order to determine the deviations of the actual output power value from the nominal output power value. Thus, it can be verified, in a simple manner, whether already a discrepancy between the actual clutch torque calculated from the transmission control device and a nominal clutch torque deposited in the transmission control device is available. This can be particularly meaningful when the tuning measures that change the actual engine torque also change on the characteristic diagram side. Also in these monitoring and/or protective measures, the difference between the actual clutch torque and the maximum nominal clutch torque above a threshold value, for instance, deposited in a reference characteristic diagram, is preferably integrated. With this threshold value, it should be guaranteed that the calculation is robust relative to common variations in the acquisition of actual clutch torque values. As soon as the integral reaches an upper limit, a tuning measure will be suggested.

A further preferred exemplary embodiment of the process is characterized in that a histogram is created, which comprises torque classes and which is continuously filled during the operation of the internal combustion engine. The histogram serves the representation of frequency distributions, especially, the deviations of the actual output power value from the nominal output power value.

A further preferred exemplary embodiment of the process is characterized in that measures are initiated for the protection of the clutch device from overload, as soon as a torque class features a significant share above maximum torque. A value for example greater than 5 percent can be considered as a significant share.

The task specified above is solved in a motor vehicle with a drive train that comprises an internal combustion engine, transmission and at least a clutch device, in that in a transmission control device a detection routine, which works in accordance with a process described beforehand, is deposited. Undesirable clutch overload can be prevented on the one hand by the process. In addition, damages to the torque transmitting parts in the drive train of the motor vehicle can be prevented. The clutch device comprises preferably at least a dry-running clutch. Preferably, the clutch device is executed as a twin clutch with two dry-running clutches. The transmission is preferably executed as parallel gearshift transmission.

Further advantages, features and details of the invention are derived from the following description in which different exemplary embodiments are described in detail.

DETAILED DESCRIPTION OF THE PREFFERED EMBODIMENTS

The invention relates particularly to motor vehicles in which a dry-running twin clutch system and a parallel gearshift are disposed in the drive train. Especially in twin clutch systems, the clutches must be certainly protected from overload. Thus, it can be achieved by means of specialty hardware and/or software measures. In conventional clutch systems, with regard to the transmission safety, the normal requirements from corresponding product requirement specifications are considered. Tuning measures that lead to torque and/or output power increase are not accounted for in conventional clutch systems.

Figure 1:
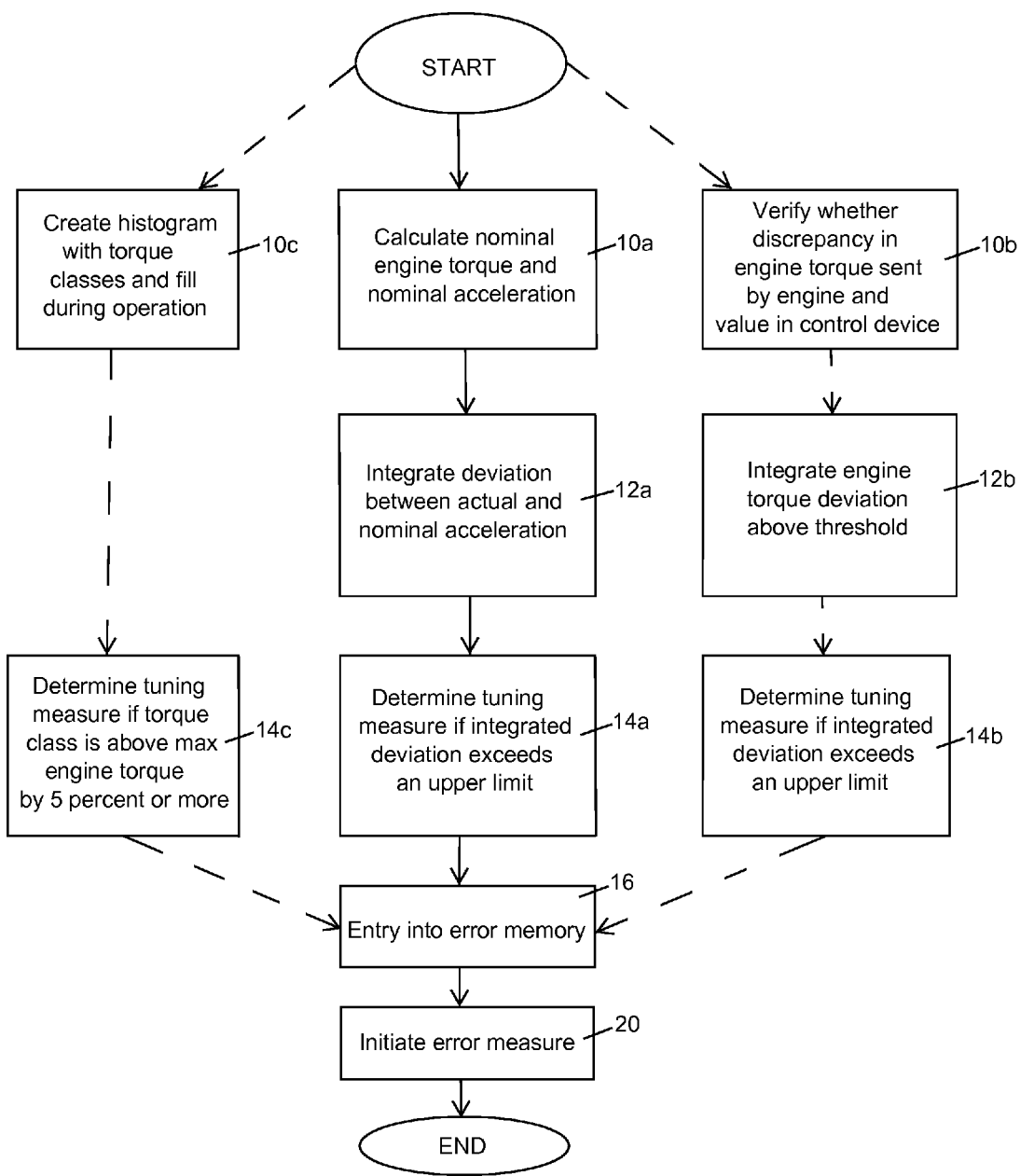
FIG. 1 is a flow diagram according to an embodiment of the present invention.
Figure 2:
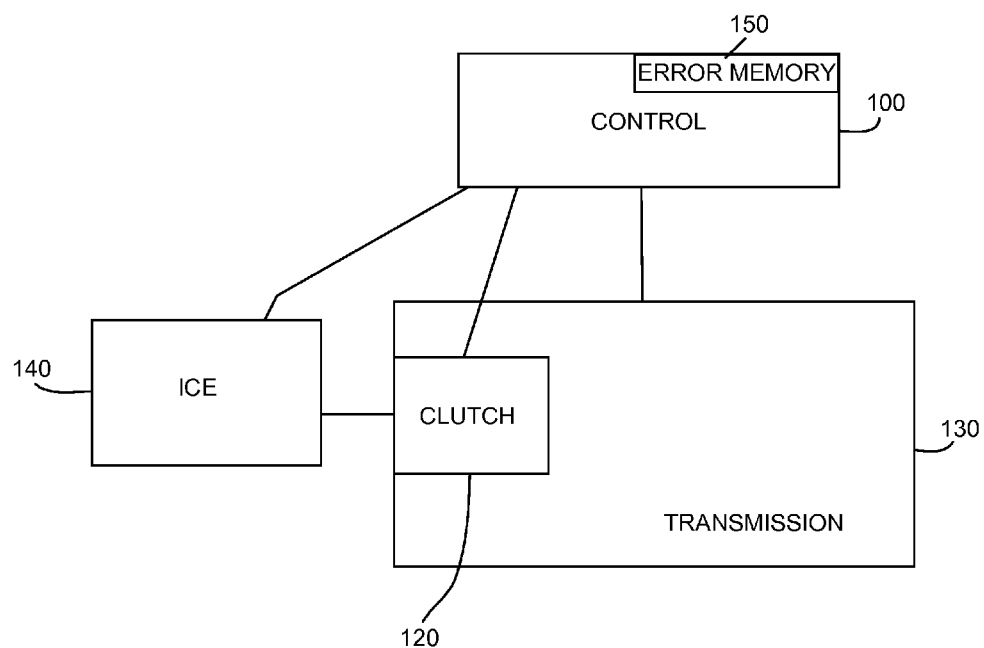
FIG. 2 is a block diagram according to an embodiment of the present invention.

In accordance with an essential aspect of the invention, shown in FIGS. 1 and 2, a process, particularly a diagnostic process, is anchored in the software installed in a transmission control device 100 such that an undesirable damage to the clutch system 120 connected between a transmission 130 and an internal combustion engine 140 is certainly prevented in the drive train. The following describe strategic measures taken in the function software, which guarantee reliable detection of tuning measures.

Vehicle relevant parameters such as mass, acceleration etc. are constantly calculated in transmission software of the motor vehicle, (FIG. 1). If it is determined that accelerations in the drive train, which are significantly higher than a maximum acceleration stored in the software, can be valued as an indication of output power increase.

With the process according to the invention the respective operating point from a substitute characteristic diagram, in which for example the engine torque is plotted against the engine speed, a corresponding nominal engine torque is calculated. The substitute characteristic diagram can be deposited in the transmission control device. From the nominal engine torque, a theoretical nominal acceleration is calculated, which is compared with the current actual acceleration, step 10a. A resulting deviation is integrated above an applicable threshold value, step 12a. If this integral value exceeds an upper limit, then the engine or the internal combustion engine delivers a higher engine torque than permitted and a turning measure is detected, step 14a.

Alternatively, it can be verified whether a discrepancy between the engine torque sent by the engine and the value deposited in the transmission control device is available, step 10b. This can then be reasonable, for example, if the tuning measures also change the actual engine torque, also from the characteristic diagram side. Also in this monitoring process, the difference between the engine torque sent by the engine and that stored in the reference characteristic diagram and the engine torque above an applicable threshold value are integrated, step 12b. If this integral value exceeds an upper limit, then a tuning measure is detected, step 14b.

Further indication can used, in that the clutch moment in areas moves, that lie clearly above the maximum engine torque to be expected. In order to detect this, it can be meaningful to create a histogram that features torque classes and that is continuously filled during operation step 10c. If a torque class is above the maximum engine torque, a significant share for example 5 percent or, this is an indication for detecting tuning measures, step 14c.

Once a tuning measure is detected, an entry is made in an error memory 150 of the transmission control device 100, step 16.

After detecting a tuning measure, a corresponding error measure can be initiated, step 20 (FIG. 1). This measure can be, for example, to cause the engine control, through an appropriate communication with the engine management, to reduce engine torque. Thus, in simple manner, one ensures that the clutch is not damaged by too high torque. A further measure that can be taken additionally or alternatively is opening at least one clutch entirely or partially in the drive train of the motor vehicle in order to stop the undesirable transmission of too high torque as quickly as possible. By opening the clutch, other torque transmitting parts in the drive train of the motor vehicle are protected against undesirable overload. After opening the clutch, further measures can be taken in order to prevent damage in the drive train. In all cases, the detection of the tuning measure should be deposited at a suitable place in control device—for example in the error memory of the transmission control device.

I claim:

1. A process for protecting a clutch device in an motor vehicle by detecting tuning measures through which the actual output power of an internal combustion engine of a motor vehicle is increased relative to design output power, comprising:
   evaluating with a software in a transmission control device deviations between an actual output power and nominal output power by comparing a current actual clutch torque with a stored limit value of the clutch torque;
   detecting a tuning measure that increases the output power of the internal combustion engine when the actual output power exceeds the stored limit value of the clutch torque;
   making an entry in an error memory of the transmission control device in response to the detecting of the tuning measure; and
   initiating measures to protect a clutch device from overload after the detecting of the tuning measure.

2. The process according to claim 1, wherein, during said steps of detecting and initiating, the deviations above a prescribed threshold value are integrated and measures are initiated to protect the clutch device from overload of the clutch device as soon as the limit value exceeds an upper limit.

3. The process according to claim 1, wherein, during said step of detecting, a current actual acceleration of the motor vehicle is compared with a nominal acceleration in order to determine the deviations of actual output power value from nominal output power value.

4. The process according to claim 3 wherein nominal acceleration is calculated from nominal torque.

5. The process according to claim 4, wherein nominal torque is calculated from a substitute characteristic diagram that is deposited in a transmission control device.

6. The process according to claim 1, wherein, during said step of detecting, current actual torque provided by the engine is compared with nominal torque in order to determine the deviations of the actual output power value from the nominal output power value.

7. The process according to claim 1, wherein, during said step of detecting, a current actual clutch torque is compared with a nominal clutch torque in order to determine the deviations of the actual output power value from the nominal output power value.

8. The process according to claim 7, wherein a histogram that comprises the torque classes is created and filled continuously during operation of the internal combustion engine.

9. The process according to claim 8, wherein, measures are initiated to protect the clutch device from overload as soon as a torque class above a maximum torque value features significant share.

10. A motor vehicle with a drive train that comprises an internal combustion engine, transmission and at least a clutch device, the motor vehicle further comprising a transmission control device, in which a detection routine is deposited, the detection routine including computer-executable instructions for:

evaluating deviations between an actual output power and nominal output power by comparing a current actual clutch torque transmitted by the clutch device when the clutch is closed with a stored limit value of the clutch torque;

detecting a tuning measure that increases the output power of the internal combustion engine when the actual output power exceeds the stored limit value of the clutch torque;

making an entry in an error memory of the transmission control device in response to the detecting of the tuning measure; and initiating measures to protect a clutch device from overload after the detecting of the tuning measure.

* * * * *